United States Patent
Liu et al.

(10) Patent No.: US 12,072,247 B2
(45) Date of Patent: Aug. 27, 2024

(54) THERMOCOUPLE STRUCTURE

(71) Applicants: WIKA Alexander Wiegand SE & Co. KG, Klingenberg (DE); WIKA Instrumentation Suzhou Co., Ltd., Jiangsu (CN)

(72) Inventors: Yunbo Liu, Beijing (CN); Michael Tier, Pearland, TX (US); Scott Coots, League City, TX (US); Robert Torgerson, Houston, TX (US); Robert Francis Poteet, Houston, TX (US); Song Zhang, Jiangsu (CN)

(73) Assignees: Wika Alexander Wiegand SE & Co. KG, Klingenberg/Main (DE); Wika Instrumentation Suzhou Co., Ltd., Jiangsu (CN)

( * ) Notice: Subject to any disclaimer, the term of this patent is extended or adjusted under 35 U.S.C. 154(b) by 539 days.

(21) Appl. No.: 17/286,756

(22) PCT Filed: Jun. 6, 2019

(86) PCT No.: PCT/CN2019/090384
§ 371 (c)(1),
(2) Date: Apr. 19, 2021

(87) PCT Pub. No.: WO2020/007162
PCT Pub. Date: Jan. 9, 2020

(65) Prior Publication Data
US 2021/0389188 A1 Dec. 16, 2021

(30) Foreign Application Priority Data
Jul. 4, 2018 (CN) .......................... 201821053818.X (51) Int. Cl.
*G01K 7/02* (2021.01)
*G01K 1/024* (2021.01)
*G01K 1/14* (2021.01)

(52) U.S. Cl.
CPC ............... *G01K 7/02* (2013.01); *G01K 1/024* (2013.01); *G01K 1/14* (2013.01)

(58) Field of Classification Search
CPC ............. G01K 7/02; G01K 1/024; G01K 1/14
See application file for complete search history.

(56) References Cited

U.S. PATENT DOCUMENTS 4,061,036 A    12/1977   Legille
4,384,793 A *   5/1983   O'Brien ................. G01K 1/026
                                                                           374/E1.005

(Continued)

FOREIGN PATENT DOCUMENTS

CN         101354290 A      1/2009
CN         201561814 U      8/2010

(Continued)

OTHER PUBLICATIONS

Blast furnace from Brittanica.com (https://www.britannica.com/print/article/69019).*

(Continued)

*Primary Examiner* — Mirellys Jagan
(74) *Attorney, Agent, or Firm* — Muncy, Geissler, Olds & Lowe, P.C.

(57) ABSTRACT

A thermocouple sensing structure for measurement of a temperature distribution inside of a vessel (10) filled fully or partially with multi-phase fluid consisting of residue oil, hydrogen, cracked oil/gas products, sulfur, catalyst particles or catalyst droplets, etc., the thermocouple sensing structure consists of a support structure (1) and a number of thermocouple sensing elements (3), the thermocouple sensing ele- (Continued)

ments (3) are partially or fully covered by the support structure (1), and wherein the closed tip (3B,3C,3D,3M) of the thermocouple sensing element (3) is passed through the support structure (1) to the inside of the vessel (10). And a support structure (1) for fixation of a thermocouple sensing element (3) in a vessel (10), in particular suitable for use in thermocouple sensing structure, the support structure (1) has a protection portion for protection of at least a lower portion of at least one thermocouple sensing element (3) relative to an upward flow direction of a fluid in the vessel (10). The static pressure of the fluid in the vessel (10) is beard by a sheath of the thermocouple such that a requirement for the strength and shape of the support structure (1) is significantly decreased. Therefore, the effect on the fluid flow field in the vessel (10) and the fluid hydraulic resistance of the temperature measurement system are reduced to a minimum level.

16 Claims, 13 Drawing Sheets (56) References Cited

U.S. PATENT DOCUMENTS

| | | | |
|---|---|---|---|
| 5,192,132 A * | 3/1993 | Pelensky | G01K 7/06 374/166 |
| 5,775,807 A | 7/1998 | Dutcher | |
| 6,543,303 B1 | 4/2003 | Hilborn et al. | |
| 9,937,476 B2 | 4/2018 | Steynberg et al. | |
| 10,067,001 B2 | 9/2018 | Yang et al. | |
| 10,712,205 B2 | 7/2020 | Del Bianco | |
| 2014/0211830 A1* | 7/2014 | Saito | G01K 1/14 374/179 |
| 2017/0199085 A1* | 7/2017 | Branken | G01K 1/14 |

FOREIGN PATENT DOCUMENTS

| | | |
|---|---|---|
| CN | 201662444 U | 12/2010 |
| CN | 201731770 U | 2/2011 |
| CN | 202869669 U | 4/2013 |
| CN | 103698029 A | 4/2014 |
| CN | 104535211 A | 4/2015 |
| CN | 112629691 A * | 4/2021 |
| EP | 3118595 A1 | 1/2017 |
| JP | 2016057142 A | 4/2016 |
| KR | 20120031761 A | 4/2012 |

OTHER PUBLICATIONS

Extended European Search Report dated May 4, 2022 in corresponding application 19830864.5.

International Search Report dated Aug. 28, 2019 in corresponding application PCT/CN2019/090384.

\* cited by examiner

THERMOCOUPLE STRUCTURE

CROSS REFERENCE TO RELATED APPLICATIONS

This application is a National Stage of International Application No. PCT/CN2019/090384, filed on Jun. 6, 2019, for which priority is claimed for Application No. 201821053818.X filed in China on Jul. 4, 2018 under 35 U.S.C. § 119;, the entire contents of all of which are hereby incorporated by reference.

FIELD OF THE INVENTION

The invention relates to a thermocouple sensing element and support structure for fixation of the thermocouple sensing element in a vessel, in particularly, relates to a support structure for flexible thermocouples inside of a slurry material or multiphase fluid vessel, for example a reactor full of multiphase mixture consisting of liquid hydrocarbon, gaseous hydrocarbon, catalyst particles/liquid drop, hydrogen and Sulphur etc. Hydraulic protection is provided to the thermocouples (TC) with an outer diameter of 3-30 mm, typically with an out diameter of ¼', 5/16', ⅜' or ½', and thereby impacts possibly generated by the support structure on the fluid field of the multiphase mixture inside of the vessel can be avoided.

BACKGROUND OF THE INVENTION

Slurry material vessels are known in the prior art. For example, U.S. Pat. No. 9,937,476 illustrates a slurry material vessel.

Raw oil and catalyst are introduced from a lower end of the vessel in these slurry material vessels and flow upwards through the vessel to an outlet located in the upper of the vessel. At least one, preferably a plurality of thermocouples are arranged along the height direction of the vessel to measure the temperature distribution situation in different positions in the inner space of the vessel.

Operating such a process under the high pressure around 150-250 bar and high temperature around 400-500° C. requires special secured sensing equipment for temperature and pressure. Especially the temperature is critical to control a secure process and to achieve best output results. An introduction of temperature sensing equipment to the inner space of such a vessel is shown in U.S. Pat. Nos. 6,543,303 or 5,775,807.

However, as the multiphase substance consisting of the reactant, reaction product, catalyst and so on flow continually upwards from the inlet to the outlet, the thermocouple is suffering from the uneven tensile stress, torsional stress and so on caused by the hydraulic resistance, then there is an abrasion on the surface of the thermocouple caused by the flowing material, leading to premature defects and failures.

SUMMARY OF THE INVENTION

It is therefore an object of the present invention to provide a thermocouple sensing structure for measurement of a temperature distribution inside of a vessel filled fully or partially with catalyst particles, or of a temperature distribution inside of a vessel filled with a liquid phase or a multiphase mixed process medium, such as a hydrocracking reaction stream with catalyst particles or droplets, and hydrogen and solid impurities, thereby preventing the destruction of the mechanical structure of the thermocouple caused by the flow and turbulence of the process medium and the abrasion damage of the surface of the thermocouple outer sheath by the multiphase fluid. The present invention, namely the support for flexible thermocouple can be used for all of the fluidized bed hydrocracking process, such as Eni EST, KBR VCC, etc. The present invention is a good solution for temperature measurement of fluidization reaction system.

The present invention provides a thermocouple sensing structure for measurement of a temperature distribution inside of a vessel filled fully or partially with catalyst particles, the thermocouple sensing structure consists of a support structure and a number of thermocouple sensing elements, wherein the vessel contains single level or multiple levels of support structures, wherein the thermocouple sensing elements each have a measuring point at a closed tip which is fixed inside the vessel by the support structures, and wherein each thermocouple sensing element together with other thermocouple sensing elements passes through a sealed port into the vessel, and wherein a connecting end of each thermocouple sensing element is electrically connected outside of the vessel to a process control system, and wherein the thermocouple sensing elements are partially or fully covered by the support structure, and wherein the closed tip of the thermocouple sensing element is passed through the support structure to the inside of the vessel.

The present invention further provides a support structure for fixation of a thermocouple sensing element in a vessel, in particular suitable for use in said thermocouple sensing structure, the support structure has a protection portion for protection of at least a lower portion of at least one thermocouple sensing element relative to an upward flow direction of a fluid in the vessel, and wherein the support structure comprises a space for accommodating more than one thermocouple sensing element, and wherein a tip of the at least one thermocouple sensing element passes through the support structure at a special point (predetermined position), wherein the at least one thermocouple sensing element is partially covered by the support structure.

It provides a firm support for the flexible thermocouple (TC) sheath against the hydraulic resistance and protects the TC from waving, vibration, collision or erosion caused by fluid turbulence.

Proposed is to use V-shaped, U-shaped, closed ring-shaped, notched ring-shaped, or box shaped structure to support and protect at least one part of TC element from the hydraulic resistance and the catalyst abrasion. Depending on the process requirement, an open side of the support structure can be facing up or facing down. Unique limiting-fixation element of a through-hole can fix and protect the temperature sensor tip. The static pressure of the fluid in the vessel is beard by a sheath of the thermocouple; the support structure is for fixing the thermocouple in the fluid and overcoming the effect of the fluid flow resistance. Since there is no need for the support structure to bear the fluid static pressure (up to above 200 bar) in the vessel, the requirement for the exterior/shape and strength of the support structure thus can be decreased, and there is minimal impact on fluid velocity and temperature field distribution. As such, there is offered a solution for reliable, durable, repairable, accurate temperature measurement and the safety of operation and equipment is enhanced.

For example, a plurality of horizontal sections can be taken at a plurality of different heights in a slurry material vessel with diameter of approx. of 5 m and height of 50 m, wherein there are 6 or more points of temperature measurement arranged on each of the horizontal sections.

Preferably, the support structure is a circle, cross, Y-shape or single arm beam, or their combination.

Preferably, the support structure is reinforced by one or more additional elements.

Preferably, the one or more additional elements are a trapezoidal limiting-fixation element or a cylindrical limiting-fixation element.

Preferably, that the one or more additional elements comprise a profile structure element selected from a hollow profile or a T-shaped or a double T-shaped structure element, and wherein at least one end of the additional element is fixed to the inner wall of the vessel.

Preferably, that the support structure is covered by a cover or a fixation element fixed to the special point.

Preferably, a bundle of thermocouple sensing elements can be supported by the support structure and can be led by the support structure to a sealed opening of the vessel to reach a connection box at which a signal connection to a process control system is formed.

Preferably, the at least one thermocouple sensing element has an outer sheath made of stainless steel and an outer diameter of 3-30 mm.

BRIEF DESCRIPTION OF THE DRAWINGS

The drawings illustrate the support structure to protect the thermocouples.

FIGS. 10B and 10B1 show a bundle of thermocouple and a closed ring-shaped support structure;

FIGS. 10C and 10C1 show a thermocouple and a notched ring-shaped support structure.

DETAILED DESCRIPTION OF THE PREFERRED EMBODIMENTS

Figure 1:
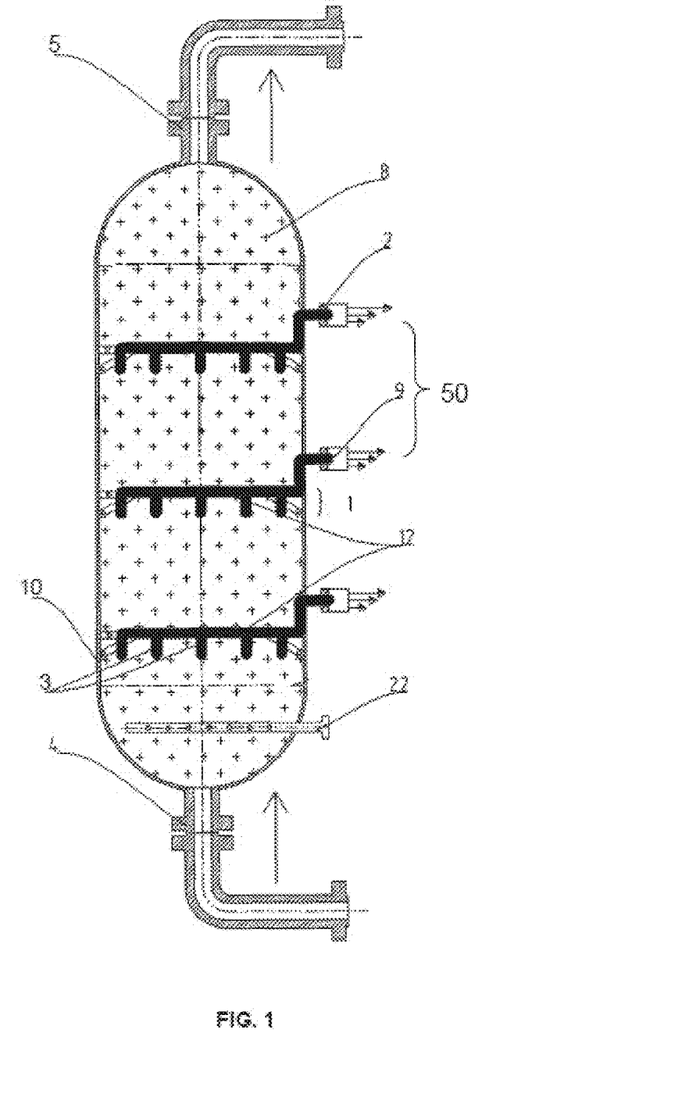
FIG. 1 shows a vessel with support structures for thermocouple elements.

FIG. 1 shows a vessel 10 having a support structure 1 for a thermocouple element (hereinafter referred to as TC element). Up to 9 or more (levels of) support structures could be applied in a vessel. Each support structure has one or more thermocouple elements (equivalent to the thermocouple sensing elements) for measuring the temperatures on different locations within the vessel filled fully or partially with catalyst particles, or multi-phase process flow consisting of residue oil, hydrocarbon, hydrogen, cracked oil/gas products, sulfur, and catalyst particles or droplets. According to the embodiment, up to 5 to 15 TC elements are provided, preferably 12 TC elements are supported at 7 to 12 levels of support structure, preferably at 9 levels of support structure The vessel has different openings 4, 5 and 22 for the introduction of various materials, and is full of a mixture consisting of liquid hydrocarbon, gaseous hydrocarbon, catalyst particles/liquid drops 8, hydrogen etc. A fluid in the vessel is a multiphase mixed fluid, which flows upwardly from an inlet to an outlet, and irregular flow such as circulating reflux, turbulence etc., may occur at a local region within the vessel. The multiphase mixed fluid in the vessel is flowing constantly and comprises liquid hydrocarbon. In a preferred solution, one or a bundle of thermocouples comes to the outside of the vessel through separate openings 2 with sealed means on each stage as mentioned in above described patent, and are connected via connection boxes 9 and measuring signal transmitting lines 50 to a process control system. That is to say, these TC element togethers pass through a sealed port into the vessel, and wherein a connecting end of each TC element is electrically connected outside of the vessel to a process control system, and wherein TC elements are partially or fully covered by the support structure in such a way that abrasive damage which may be caused from upcoming catalyst particles is prevented. A bundle of TC elements of each level is led to a sealed opening of the vessel to reach a connection box at which a signal connection to the process control system is formed.

Figure 2A:
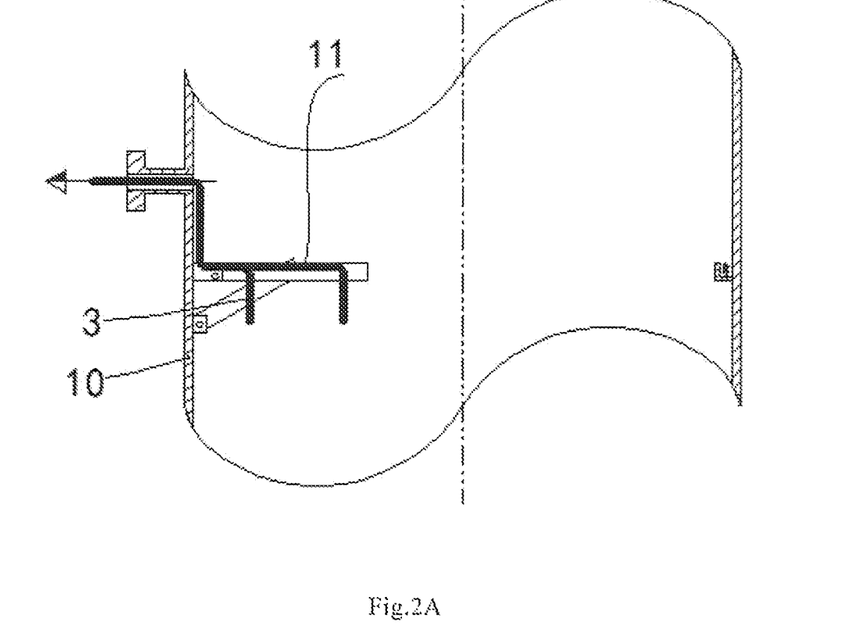
FIG. 2A shows a single arm support structure for the thermocouple element in a part of the vessel.
Figure 2B:
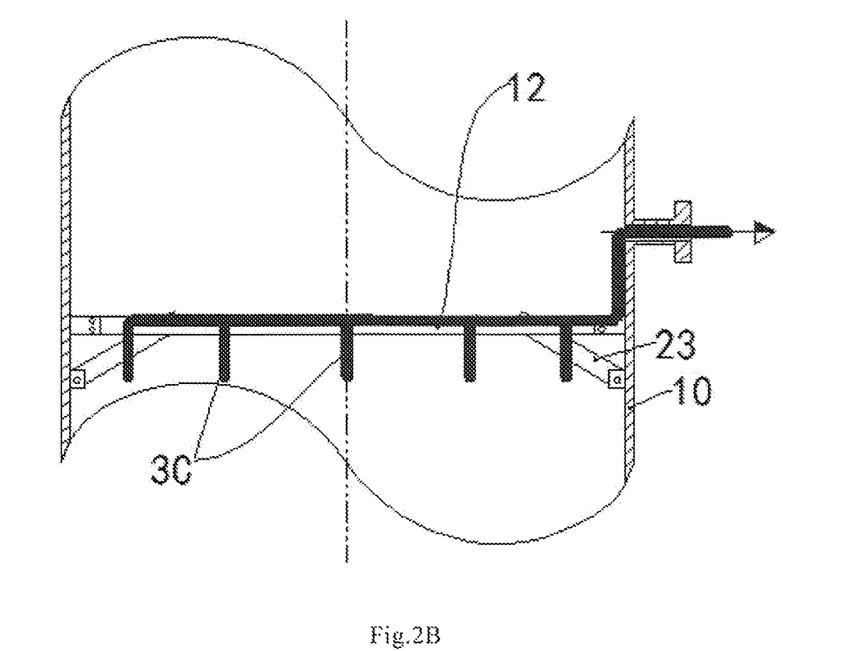
FIG. 2B shows a full support structure for five thermocouple elements which expands from one side to the other side of the vessel.
Figure 2C:
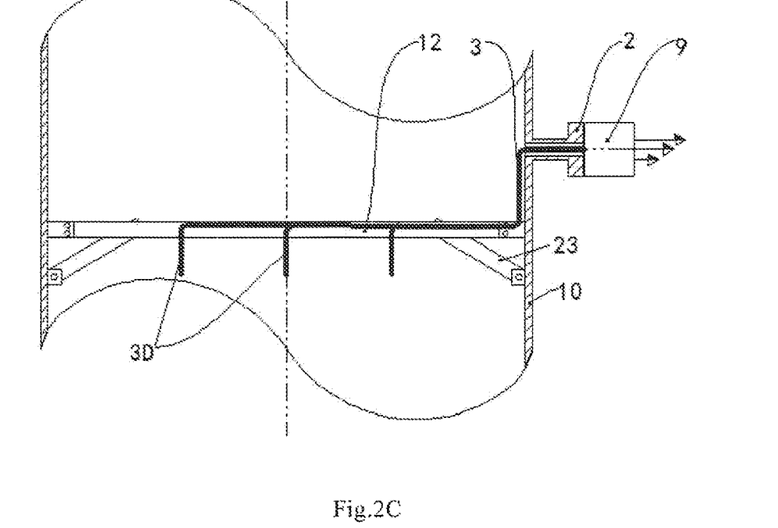
FIG. 2C shows a full support structure for three thermocouple elements which expands from one side to the other side of the vessel.

FIG. 2A show a single arm support structure 11 for the TC element 3 in a part of the vessel, the TC element leads to the outside of the vessel 10 through separate opening 2; FIG. 2B shows a full support structure 12 for five TC elements 3C which expands from one side to the other side of the vessel, supported by arms 23. The bundle of TC comes to the right outer wall of the vessel 10 through an opening 2. FIG. 2C shows a full support structure 12 for three TC elements 3D which expands from one side to the other side of the vessel, supported by arms 23. The bundle of TC comes to the left outside through an opening 2 to a connection box 9.

The TC elements 3 are protected inside the support structure 12 and only the tips 3D are going downwardly through the support structure 12. The support structure has a protection portion for covering the TC elements and a support element for distribution of the TC elements, and wherein a tip of the TC element is fixed to a special point within the vessel. The fluid in the vessel 10 runs from an inlet 4 towards an outlet 5 (generally in an upward direction), and one or more bundle of TC element (at least one TC element) is mounted within the vessel by the support structure, covered mainly at their lower side which faces the bottom of the vessel 10, in order to protect at least a lower portion of at least one TC element relative to an upward flow direction of a fluid in the vessel, and wherein the support structure comprises a space for accommodating more than one TC element, and wherein a tip of the at least one TC element passes through the support structure at a special point, wherein the at least one TC element is partially covered by the support structure.

Figure 3A:
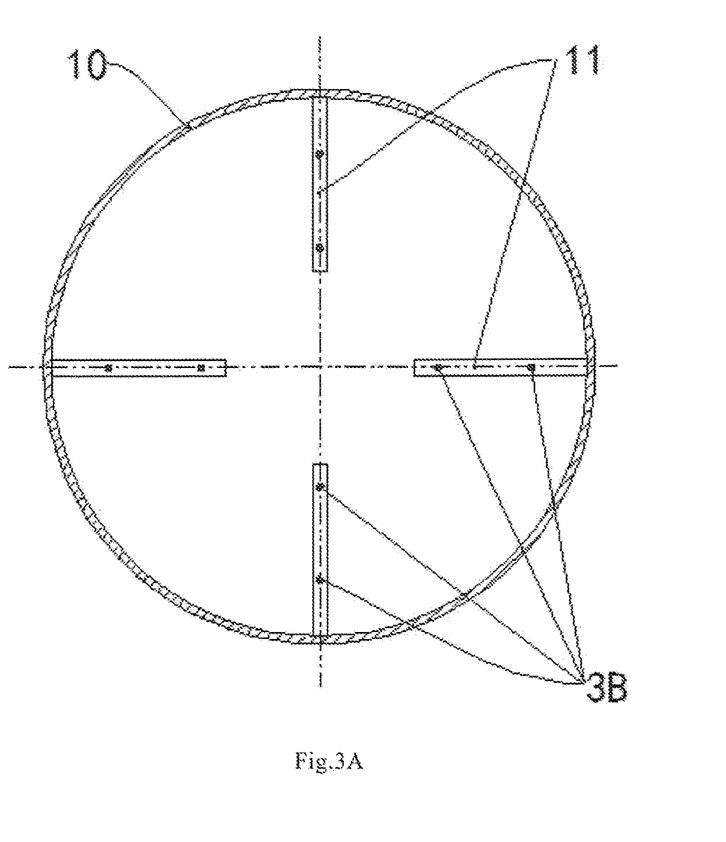
FIG. 3A shows a single arm support structure for eight thermocouple elements in top view of a part of the vessel.

FIG. 3A shows a single arm support structure 11 for eight TC elements 3 in top view of a part of the vessel. On each single arm support structure 11 there are two bores through which a TC tip 3B protrudes downwardly in the vessel.

Figure 3B:
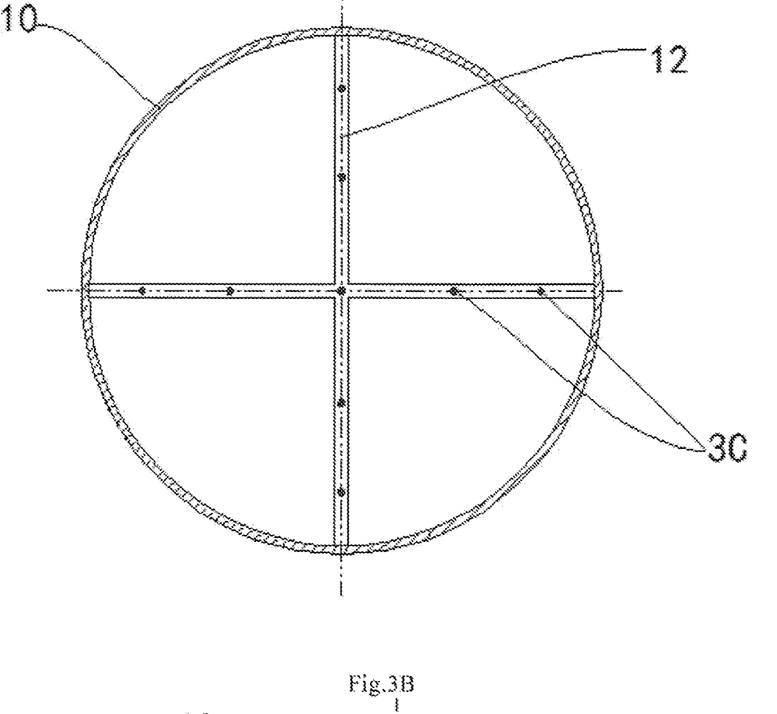
FIG. 3B shows a full support structure for nine thermocouple elements in top view of a part of the vessel.

FIG. 3B shows a full support structure 12 for nine TC elements 3C in a top view of a part of the vessel creating a cross. On each support structure arm 12 there are two bores through which a TC tip 3C protrudes downwardly in the vessel. In addition, one bore is located in the middle to allow measurement of the temperature in the middle of the vessel 10.

Figure 3C:
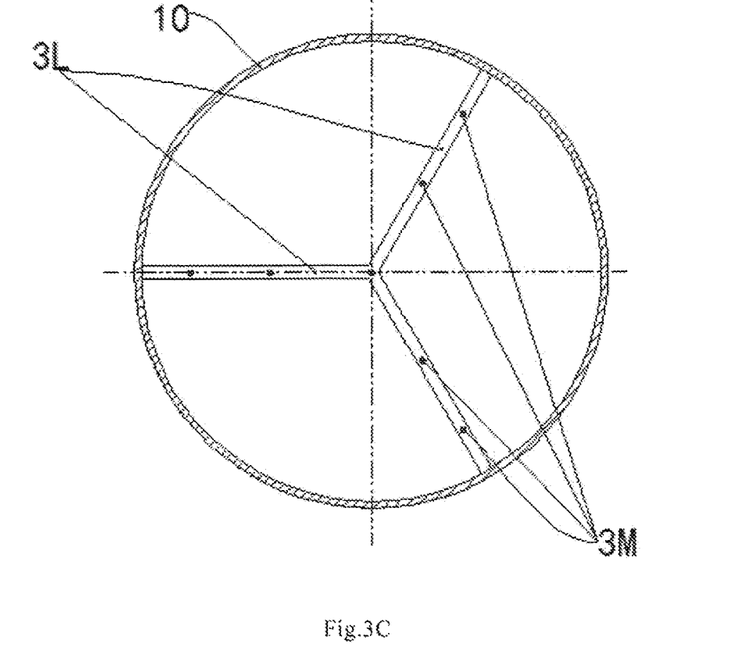
FIG. 3C shows a full support structure for seven thermocouple elements in top view of a part of the vessel.

FIG. 3C shows a full support structure for seven TC elements 3L in a top view of a part of the vessel creating a Y shape. On each support structure arm there are two bores through which a TC tip 3M protrudes downwardly in the vessel. In addition, one bore is located in the middle to allow measurement of the temperature in the middle of the vessel 10.

Figure 4:
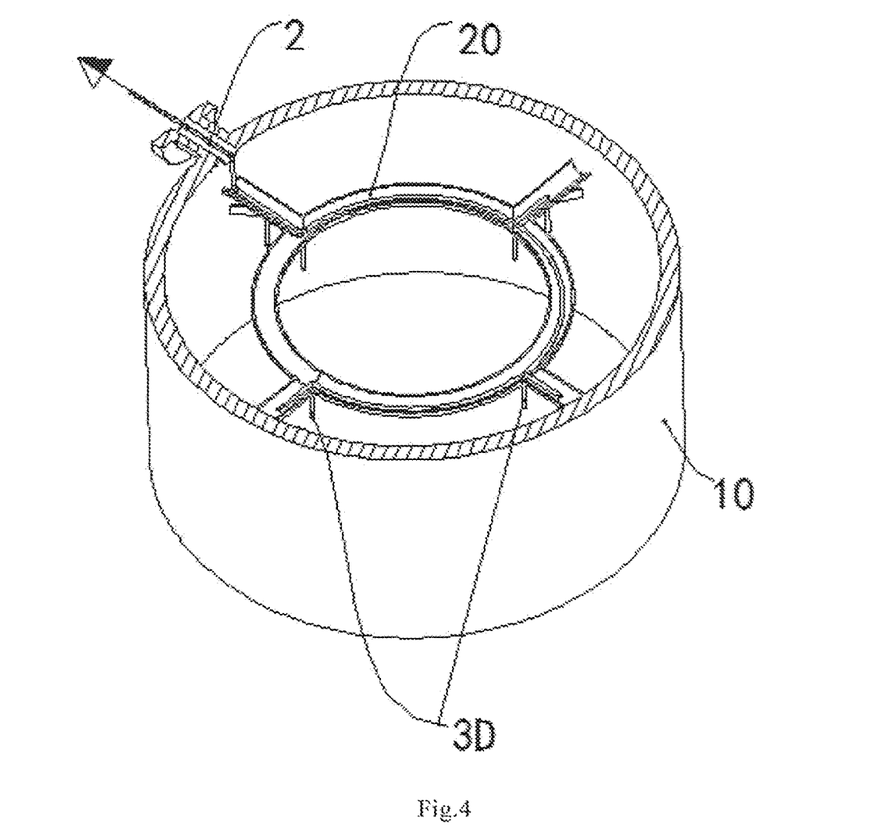
FIG. 4 shows a full support structure for a plurality of thermocouple elements in tope view of a part of the vessel.

FIG. 4 shows a full support structure 20 for a plurality of TC elements 3 in a top view of a part of the vessel creating a circle. On different locations of the support structure 20 there are bores prepared to allow to downwardly position and protrude one or several TC tips 3D downwards in the vessel 10.

Figure 5A:
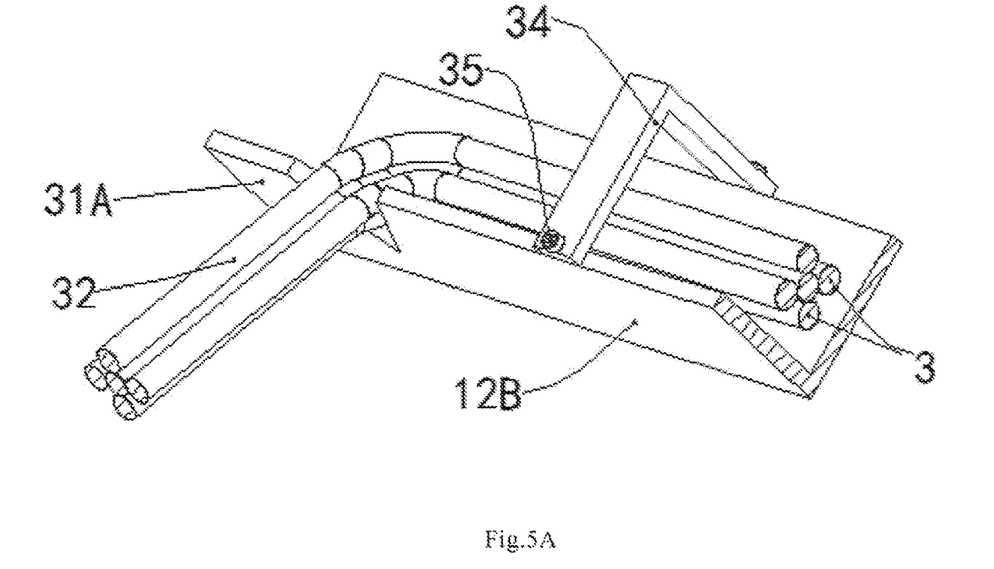
FIG. 5A shows a part of a V-shaped support structure for a bundle of thermocouple elements secured by a fixation and a screw.

FIG. 5A shows a part of a V-shaped support structure 12B for a bundle of TC elements 32 secured by a fixation 34 and a screw 35. One end 31A of the support structure is located at the wall of the vessel, and the TC element protrudes from an opening 37A of the support structure.

Figure 5B:
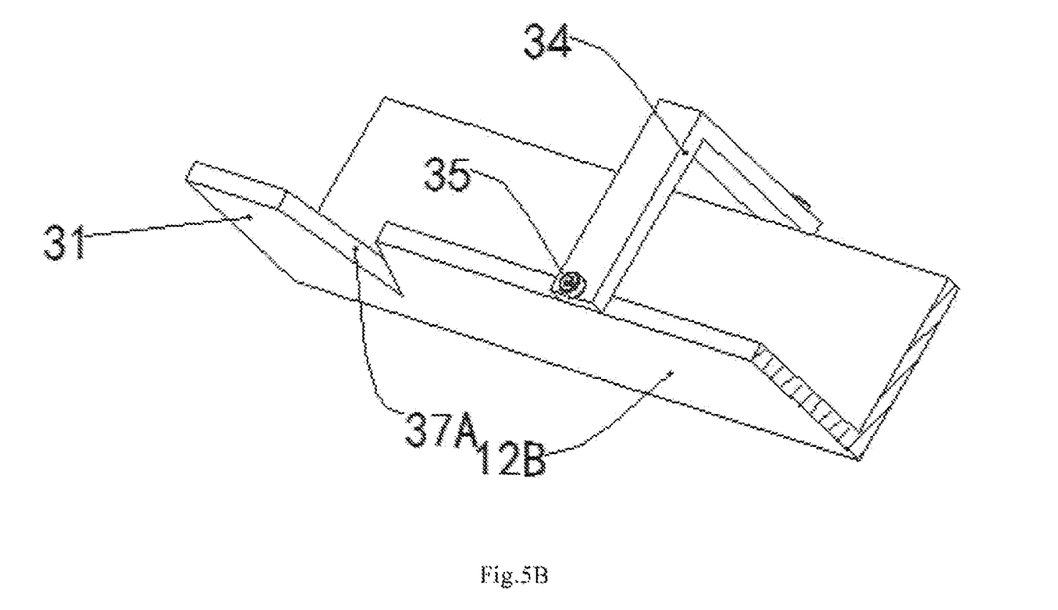
FIG. 5B shows a part of a V-shaped support structure for a bundle of thermocouple elements.

FIG. 5B shows a part of a V-shaped support structure 12B for a bundle of TC elements; whereby a V-shaped opening 37A in the V-shaped support structure 31 allows the TC element to protrude from the opening.

Figure 5C:
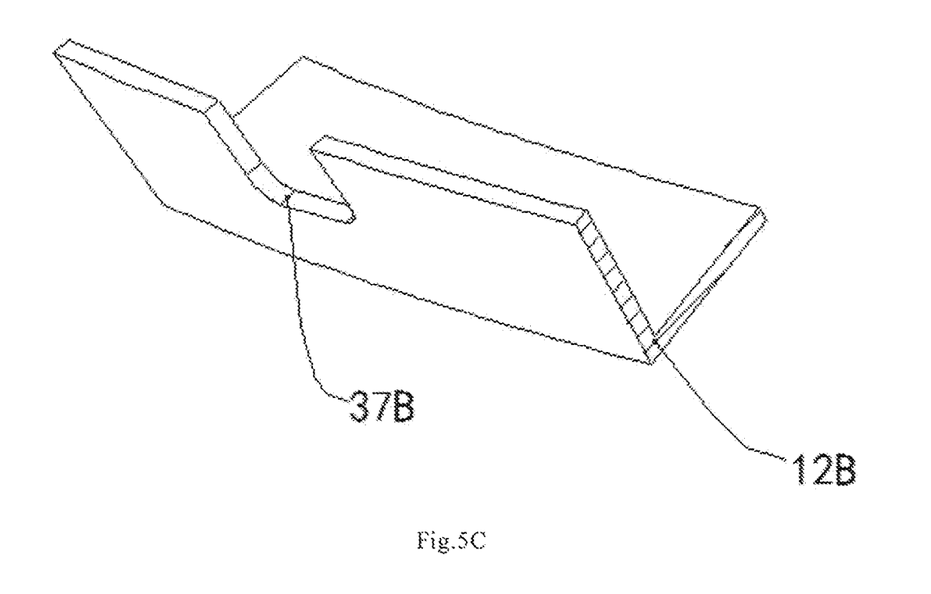
FIG. 5C shows a part of a V-shaped support structure for a bundle of thermocouple elements.

FIG. 5C shows a part of a V-shaped support structure 12B for a bundle of TC elements; whereby a U-shaped opening 37B in the V-shaped support structure allows the TC element to protrude from the opening.

Figure 5D:
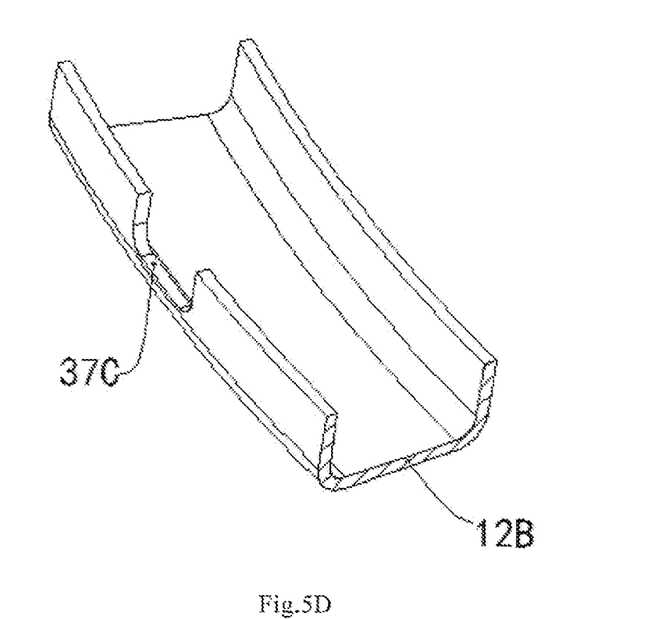
FIG. 5D shows a part of a U-shaped support structure for a bundle of thermocouple elements.

FIG. 5D shows a part of a U-shaped support structure 12B for a bundle of TC elements; whereby a U-shaped opening 37C in the U-shaped support structure allows the TC element to protrude from the opening.

Figure 6A:
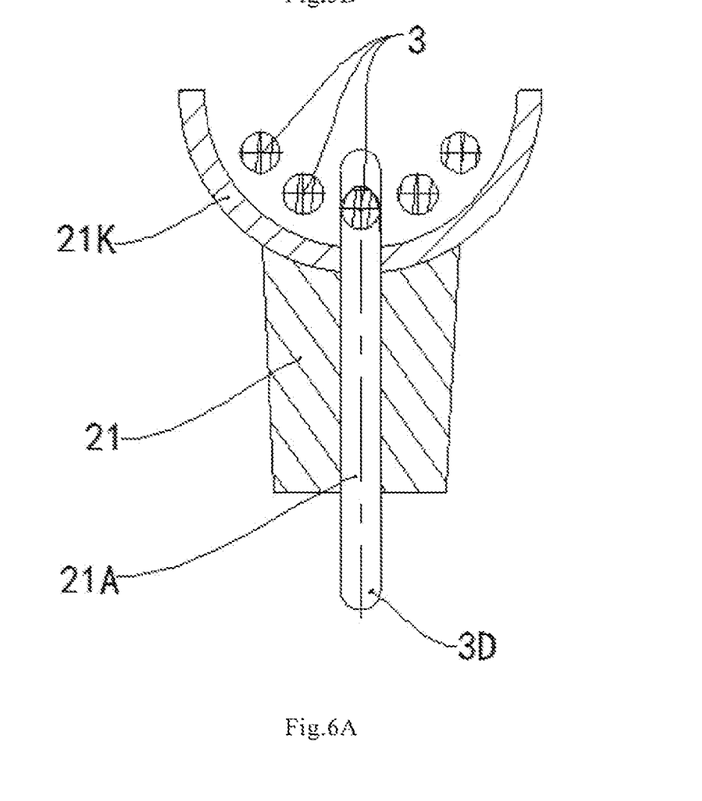
FIG. 6A shows a cut of a notched ring-shaped support structure with an opening formed upwardly for a bundle of thermocouple elements.

FIG. 6A shows a cut of a notched ring-shaped support structure 21K with an opening formed upwardly for a bundle of TC elements; whereby the notched ring-shaped support structure contains a limiting-fixation element 21, and a bore 21A passes through the notched ring-shaped support structure and the limiting-fixation element 21, thereby forming a downward path for TC elements, and only the tip 3D with a length of 5-300 mm, preferably 30-80 mm, reaches the outside of the limiting-fixation element 21.

Figure 6B:
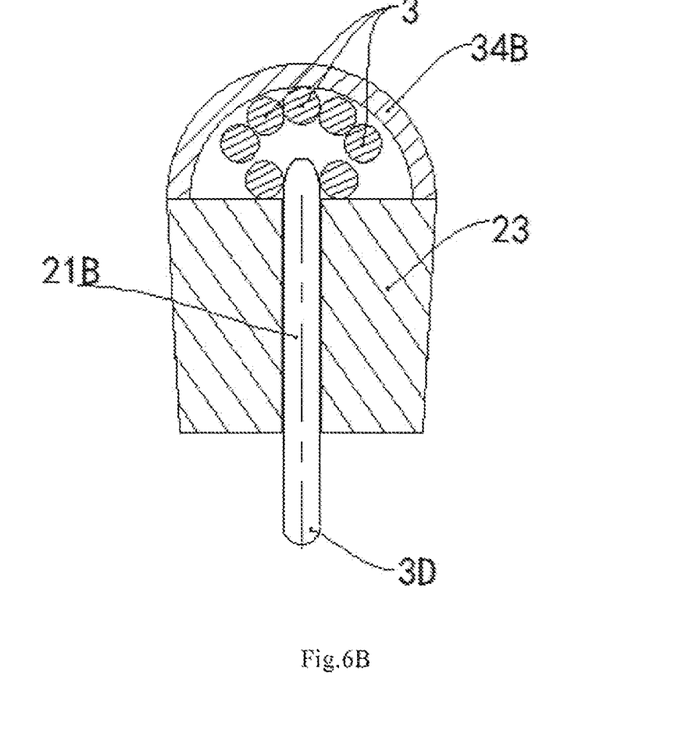
FIG. 6B shows a cut of a notched ring-shaped support structure with an opening formed downwardly.

FIG. 6B show a cut of a notched ring-shaped support structure 34B with an opening formed downwardly. The notched ring-shaped cover 34B provides functions of fixation and protection for a bundle of TC elements 3, whereby the support structure contains a limiting-fixation element 23 forming a bore 21B for a downward path for TC elements.

Figure 7:
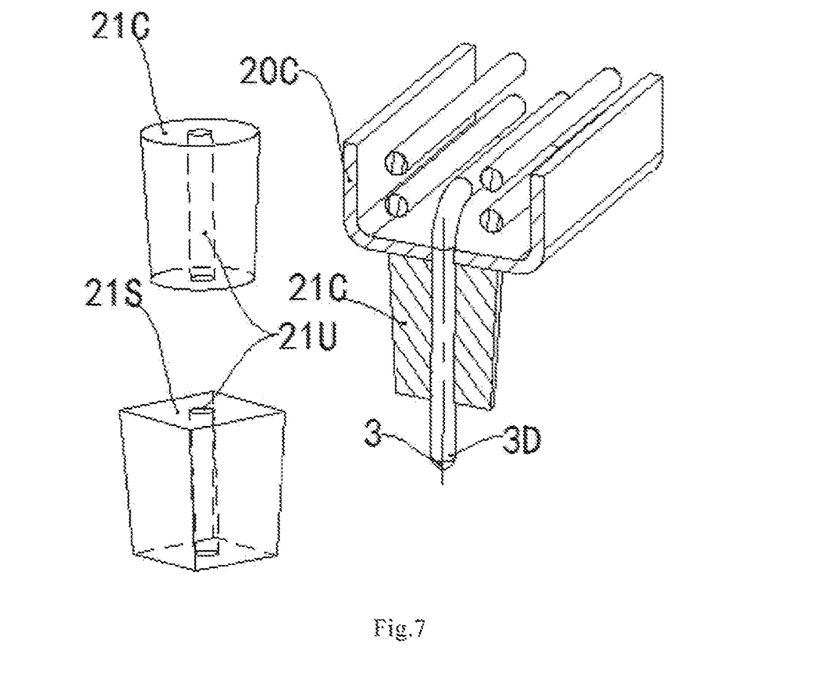
FIG. 7 shows a cut of a U-shaped support structure for a bundle of thermocouple elements.

FIG. 7 shows a cut of a U-shaped support structure 20C for a bundle of TC elements, whereby the U-shaped support structure contains a cylindrical limiting-fixation element 21C or trapezoidal limiting-fixation element 21S, and a bore 21U passes through the U-shaped support structure and the limiting-fixation element 21C or 21S, thereby forming a downward path for the TC elements, only a tip 3D with a length of 5-300 mm, preferably 30-80 mm reaches the outside of the limiting-fixation element 21C or 21S.

Figure 8:
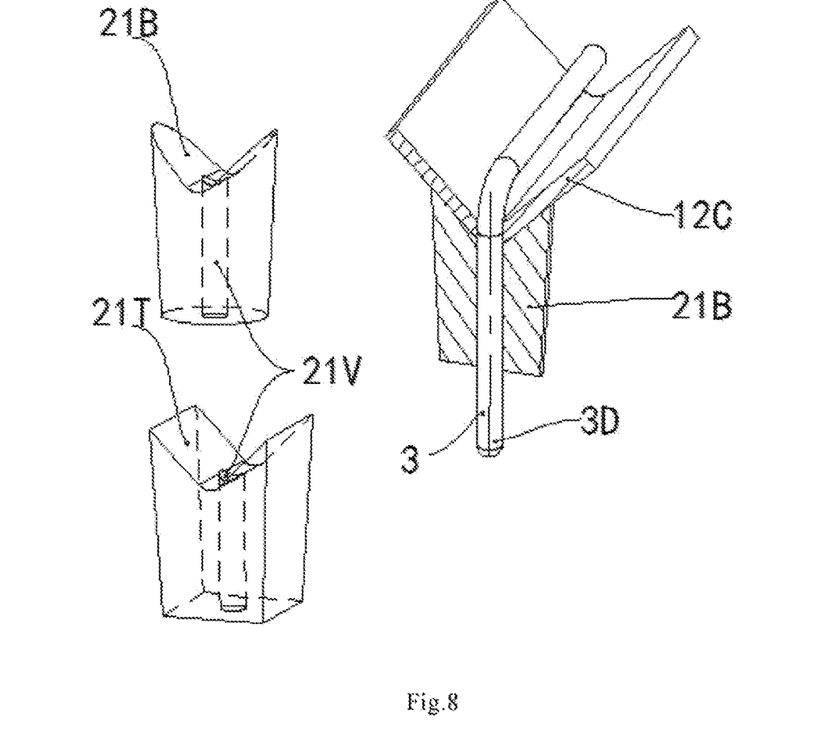
FIG. 8 shows a cut of a V-shaped support structure for a bundle of thermocouple elements.

FIG. 8 shows a cut of a V-shaped support structure 12C for a bundle of TC elements, whereby V-shaped support structure contains a cylindrical limiting-fixation element 21B or trapezoidal limiting-fixation element 21T, and a bore 21V passes through the V-shaped support structure and the limiting-fixation element 21B or 21T, thereby forming a downward path for the TC elements, only a tip 3D with a length of 5-300 mm, preferably 30-80 mm reaches the outside of the limiting-fixation element.

The sheath (also known as outer sheath) of TC element has a diameter, preferably an outer diameter of ¼', ⁵⁄₁₆', or ⅛', ³⁄₁₆', ½', as well as 4, 6 or 8 mm, wherein the sheath is made of stainless steel.

Figure 9A:
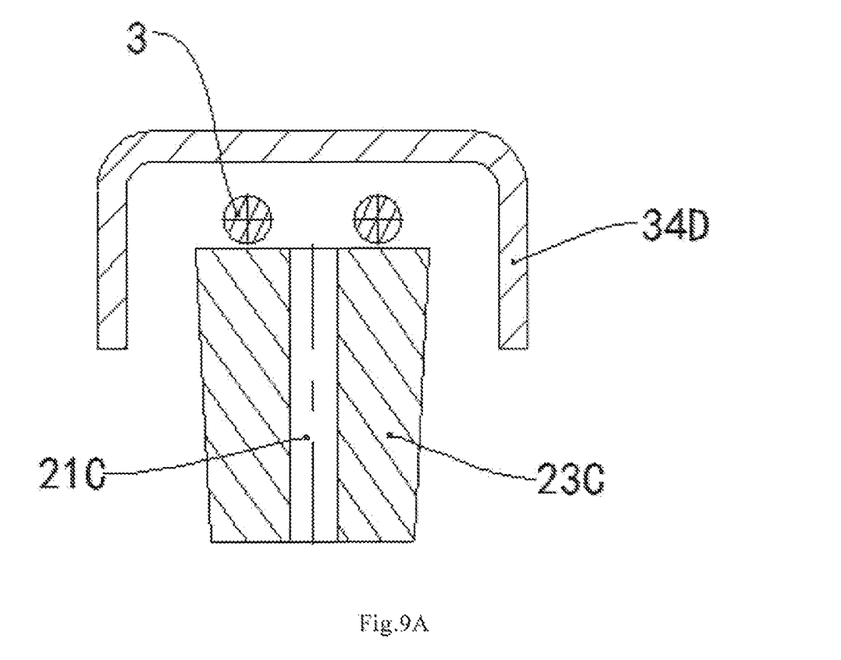
FIG. 9A shows a cut of an inverted U-shaped support structure with an opening formed downwardly for a bundle of thermocouple elements.

FIG. 9A shows a cut of an inverted U shaped-support structure 34D with an opening formed downwardly for a bundle of TC elements 3, whereby the support structure contains a limiting-fixation element 23C, and a bore 21C passes through the support structure, thereby forming a downward path for the TC elements. The support structure is covered by an inverted U-shaped cover 34D over the entire length of the TC element 3 to form protection and play a role of fixation.

Figure 9B:
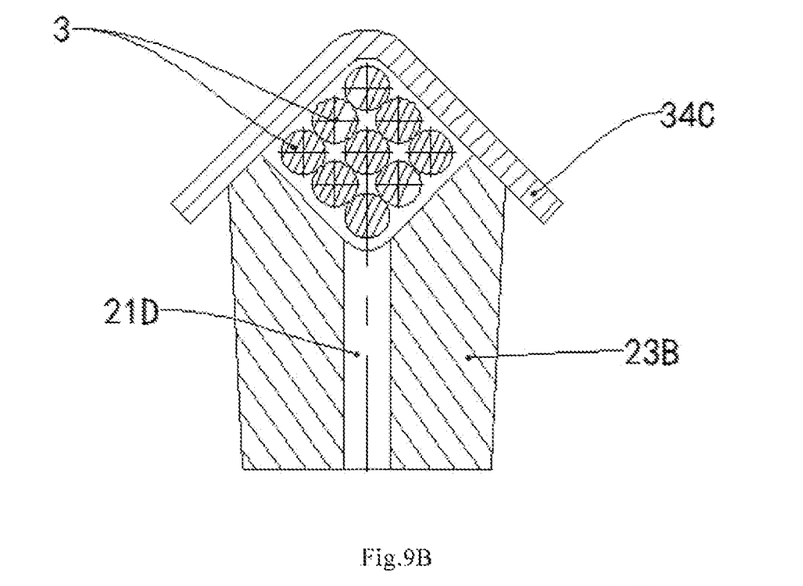
FIG. 9B shows a cut of an inverted V-shaped support structure with an opening formed downwardly for a bundle of thermocouple elements.

FIG. 9B shows a cut of an inverted V-shaped support structure 23B with an opening formed downwardly for a bundle of TC elements 3, whereby the support structure contains a limiting-fixation element 23B, and several bores 21D pass through the support structure, thereby forming a downward path for the TC elements. The support structure is covered by an inverted V-shaped cover 34C over the entire or part length of the TC element 3 to form a protection and play a role of fixation.

Figure 9C:
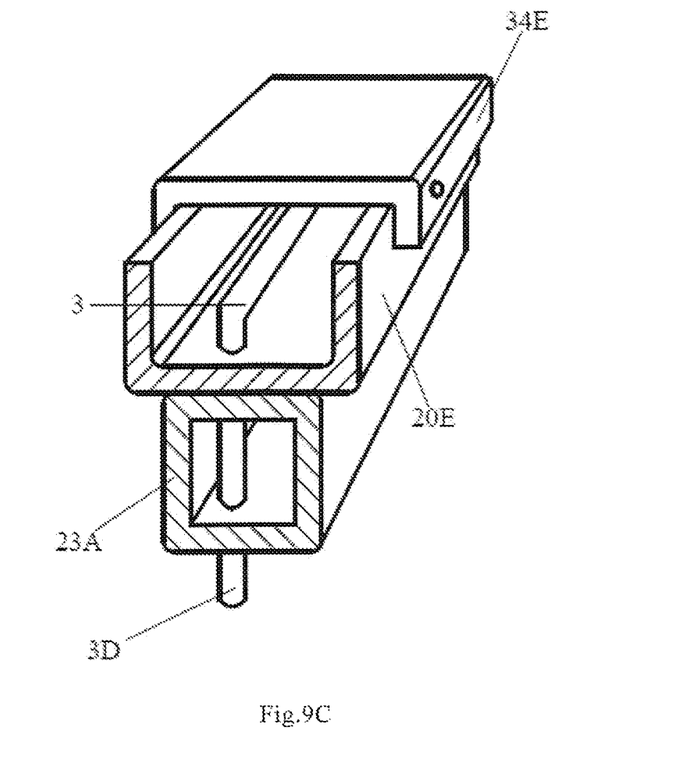
FIG. 9C shows a cut of a rectangular hollow support structure for thermocouple elements.

FIG. 9C shows a cut of a rectangular hollow support structure 23A for the TC elements 3, whereby the support structure contains a hollow rod 23A, which supports a U-shaped guide element 20E having a cover 34E, and several bores pass through the support structure, thereby forming a downward path for a tip 3D of the TC element. The support structure is covered by the U-shaped cover 34E over the part or entire length to form a peripheral protection.

Figure 9D:
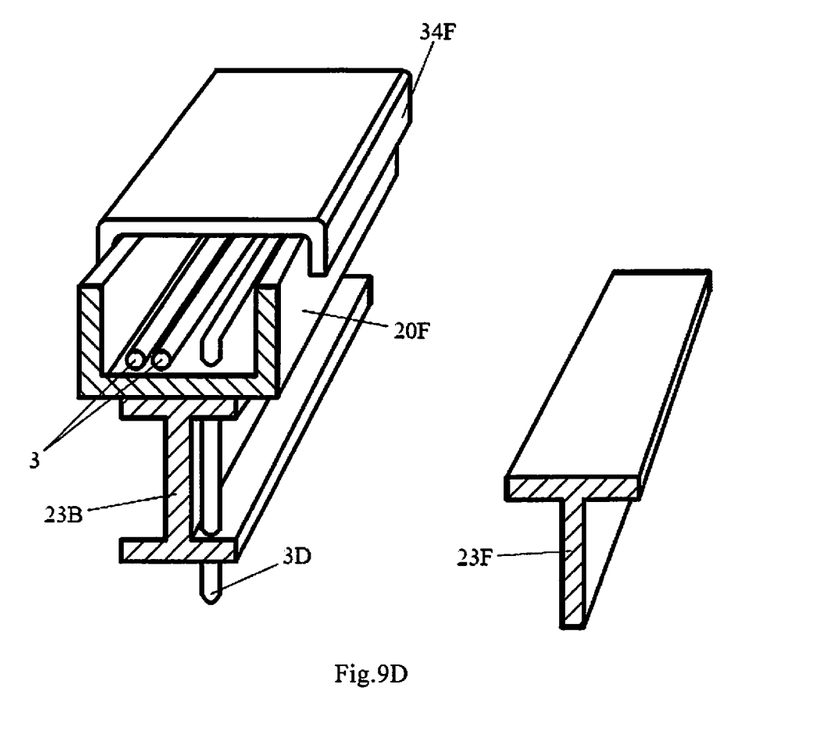
FIG. 9D shows a cut of a T-shaped support structure for thermocouple elements.

FIG. 9D shows a cut of a T-shaped support structure for the TC elements 3, whereby the support structure contains a double T-shaped element 23B supporting a U-shaped guide element 20F having a cover 34F, and several bores pass through the support structure, thereby forming a downward path for the tip 3D of the TC element. The support structure is covered by the U-shaped cover 34F over the part or entire length to form a peripheral protection. The T-shaped support structure may be made in a way of a single T shaped element 23F or a double T-shaped element 23B.

Figure 10A:
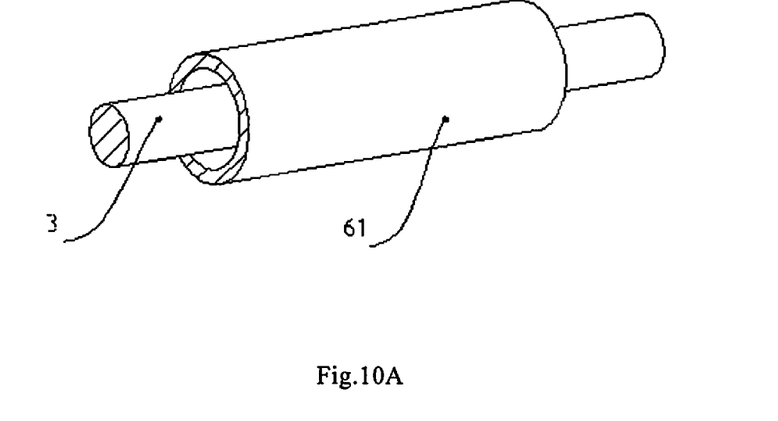
FIG. 10A shows a thermocouple and a closed ring-shaped support structure.
Figure 10B:
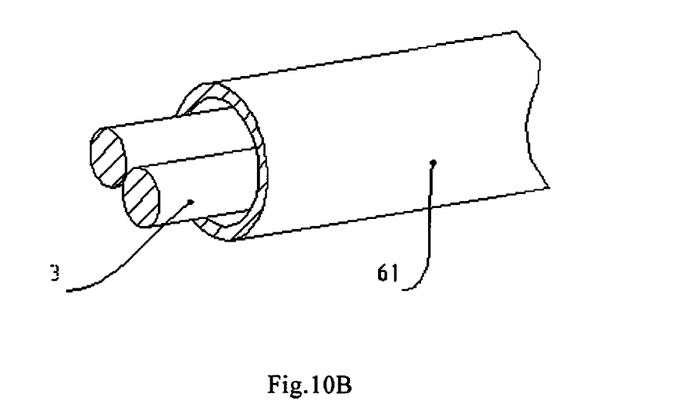
Figure 10B:
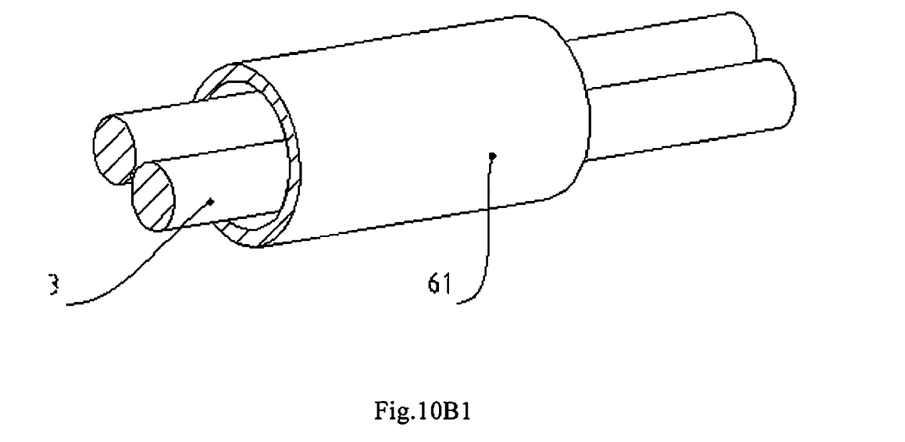
Figure 10C:
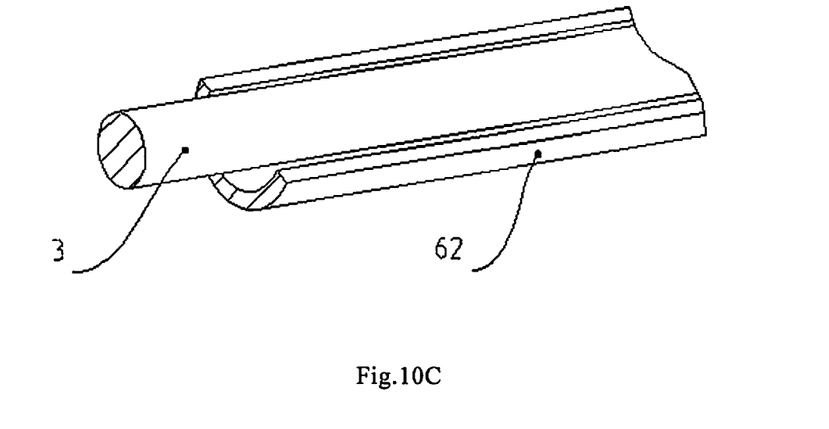
Figure 10C:
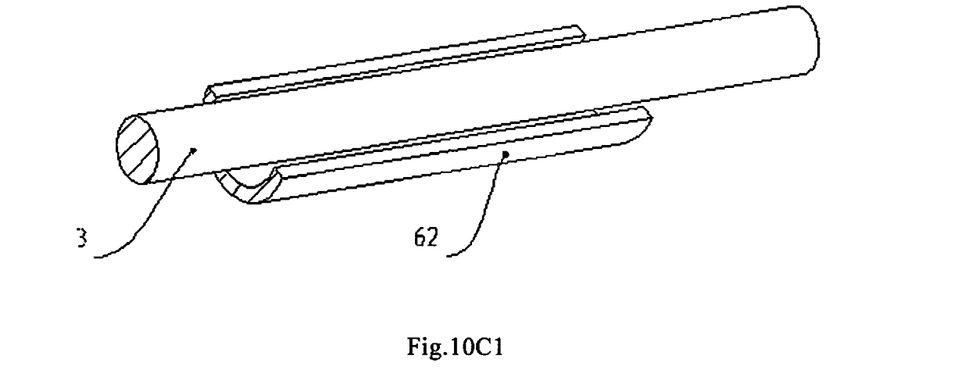

FIGS. 10A, 10B and 10C show the TC element 3 as mentioned above, the closed ring-shaped support structure 61 and the notched ring-shaped support structure 62. The support structure plays a role of supporting and protecting by covering and wrapping the TC element 3.

Figure 11:
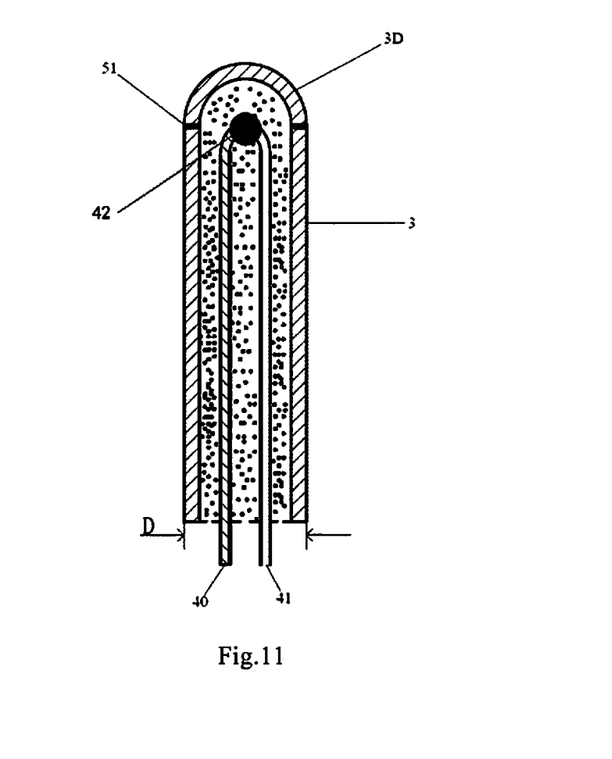
FIG. 11 shows a cut of the thermocouple as mentioned above.

FIG. 11 shows a cut of the TC element 3 as mentioned above, having a metal outer sheath made of stainless steel and with a length of 3-30 mm, and an inner junction of two positive and negative thermocouple wires 40, 41, which measures the temperature within the tip. The tip is closed by a weld 51 on top of the junction 42, constitutes a measurement point of the TC element at the closed tip. The thermocouple wires are surrounded by MgO (magnesia) powder which is tightly filled in the sheathing pipe, with resultant insulation between the thermocouple wires, the thermocouple wire and the metal sheath being kept, and the thermocouple wires are fixed in the container.

The invention claimed is:

1. A thermocouple sensing structure for measurement of a temperature distribution inside of a vessel filled fully or partially with a multi-phase mixed fluid, the multi-phase mixed fluid comprising residue oil, hydrogen, cracked oil/gas products, sulfur, catalyst particles or catalyst droplets, wherein the thermocouple sensing structure comprises:
a support structure; and
a number of thermocouple sensing elements,
wherein the vessel contains one or more levels of support structures,
wherein the thermocouple sensing elements each have a measuring point at a closed tip which is fixed inside the vessel by at least one of the support structures,
wherein each thermocouple sensing element together with other thermocouple sensing elements pass through a sealed port into the vessel,
wherein a connecting end of each thermocouple sensing element is electrically connected outside of the vessel to a process control system,
wherein each one of the thermocouple sensing elements is partially or fully covered by at least one of the support structures,
wherein the closed tip of each one of the thermocouple sensing elements is passed through at least one of the support structures to the inside of the vessel,
wherein at least one of the support structures has a protection portion for covering the thermocouple sensing elements and a support element for distribution of the thermocouple sensing elements,
wherein the closed tip of the thermocouple sensing elements passes through the support structure at a special point within the vessel,
wherein at least one of the support structures is reinforced by one or more additional elements, the one or more additional elements comprising a profile structure element selected from a hollow profile or a T-shaped or a double T-shaped structure element, and
wherein at least one end of the one or more additional elements is fixed to an inner wall of the vessel thereby forming a downward path for the closed tip of the thermocouple sensing elements.

2. The thermocouple sensing structure according to claim 1, wherein the thermocouple sensing elements are partially covered by at least one of the support structures in such a way that abrasive damage which may be caused from upwardly flowing catalyst particles carried by the multi-phase mixed fluid is prevented.

3. The thermocouple sensing structure according to claim 1, wherein a bundle of thermocouple sensing elements of each level is led to a sealed opening of the vessel to reach a connection box at which a signal connection to the process control system is formed.

4. The thermocouple sensing structures according to claim 1, wherein up to 5 to 15 thermocouple sensing elements are supported at up to 7 to 12 levels of support structures.

5. The thermocouple sensing structure according to claim 1, wherein the multi-phase mixed fluid in the vessel flows upwardly from an inlet to an outlet, and irregular flow circulating reflux or turbulence occurs at a local region within the vessel.

6. The thermocouple sensing structure according to claim 5, wherein the multi-phase mixed fluid in the vessel flows constantly and comprises mainly liquid hydrocarbons.

7. A support structure for fixation of a thermocouple sensing element in a vessel, suitable for use in a thermocouple sensing structure according to claim 1, wherein the support structure has a protection portion for protection of at least a lower portion of at least one thermocouple sensing element relative to an upward flow direction of the multi-phase mixed fluid in the vessel, wherein the support structure comprises a space for accommodating more than one thermocouple sensing element, wherein the closed tip of the at least one thermocouple sensing element passes through the support structure at a special point, and wherein the at least one thermocouple sensing element is partially covered by the support structure.

8. The support structure for fixation of a thermocouple sensing element in a vessel according to claim 7, wherein the multi-phase mixed fluid is a multiphase mixed fluid which flows upwardly from an inlet to an outlet, and irregular flow circulating reflux or turbulence occurs at a local region within the vessel.

9. The support structure for fixation of a thermocouple sensing element in a vessel according to claim 7, wherein the multi-phase mixed fluid in the vessel is flowing constantly and comprises mainly liquid hydrocarbon.

10. The support structure for fixation of a thermocouple sensing element in a vessel according to claim 7, wherein the support structure protects at least one part of the at least one thermocouple sensing element from flow impact and abrasion by a U-shaped, or V-shaped, or closed ring-shaped, or notched ring-shaped structure.

11. The support structure for fixation of a thermocouple sensing element in a vessel according to claim 7, wherein the support structure is a circle, cross, Y-shape or single arm beam, or their combination.

12. The support structure for fixation of a thermocouple sensing element in a vessel according to claim 7, wherein the support structure is covered by a cover or a fixation element fixed to the special point.

13. The support structure for fixation of a thermocouple sensing element in a vessel according to claim 7, wherein a bundle of thermocouple sensing elements can be supported by the support structure and can be led by the support structure to a sealed opening of the vessel to reach a connection box at which a signal connection to the process control system is formed.

14. The support structure for fixation of a thermocouple sensing element in a vessel according to claim 7, wherein the at least one thermocouple sensing element has an outer sheath made of stainless steel and an outer diameter of 3-30 mm.

15. A thermocouple sensing structure for measurement of a temperature distribution inside of a vessel filled fully or partially with a multi-phase mixed fluid, the multi-phase mixed fluid comprising residue oil, hydrogen, cracked oil/gas products, sulfur, catalyst particles or catalyst droplets, wherein the thermocouple sensing structure comprises:

a support structure; and a number of thermocouple sensing elements, wherein the vessel contains one or more levels of support structures, wherein the thermocouple sensing elements each have a measuring point at a closed tip which is fixed inside the vessel by at least one of the support structures, wherein each thermocouple sensing element together with other thermocouple sensing elements pass through a sealed port into the vessel, wherein a connecting end of each thermocouple sensing element is electrically connected outside of the vessel to a process control system, wherein each one of the thermocouple sensing elements is partially or fully covered by at least one of the support structures, wherein the closed tip of each one of the thermocouple sensing elements is passed through at least one of the support structures to the inside of the vessel, wherein at least one of the support structures has a protection portion for covering the thermocouple sensing elements and a support element for distribution of the thermocouple sensing elements, wherein the closed tip of the thermocouple sensing elements is fixed to a special point within the vessel, wherein at least one of the support structures is reinforced by one or more additional element, wherein a bore passes through the support structure and a limiting-fixation element thereby forming a downward path to the closed tip of each one of the thermocouple sensing elements, and wherein the one or more additional elements are a trapezoidal limiting-fixation element or a cylindrical limiting-fixation element.

16. The thermocouple sensing structure for measurement of a temperature distribution inside of a vessel with a multi-phase fluid according to claim 15, wherein there are at least two thermocouple sensing elements, and wherein each of the at least two thermocouple sensing elements together with other thermocouple sensing elements pass through the sealed port into the vessel.

* * * * *